United States Patent
Nouvel et al.

(10) Patent No.: US 11,017,256 B2
(45) Date of Patent: May 25, 2021

(54) RAPID ANALYSIS OF IMAGES

(71) Applicant: THALES, Courbevoie (FR)

(72) Inventors: Christian Nouvel, Merignac (FR); Sébastien Ellero, Pessac (FR)

(73) Assignee: THALES, Courbevoie (FR)

( * ) Notice: Subject to any disclaimer, the term of this patent is extended or adjusted under 35 U.S.C. 154(b) by 10 days.

(21) Appl. No.: 16/601,426

(22) Filed: Oct. 14, 2019

(65) Prior Publication Data
US 2020/0125878 A1    Apr. 23, 2020

(30) Foreign Application Priority Data
Oct. 18, 2018 (FR) ........................... 1801094

(51) Int. Cl.
  *G06K 9/32*    (2006.01)
  *G06F 17/18*   (2006.01)
  *G06K 9/62*    (2006.01)
  *G06T 9/00*    (2006.01)

(52) U.S. Cl.
  CPC ........... *G06K 9/3233* (2013.01); *G06F 17/18* (2013.01); *G06K 9/6267* (2013.01); *G06T 9/00* (2013.01)

(58) Field of Classification Search
  CPC .................................................. G06K 9/3233
  See application file for complete search history.

(56) References Cited

U.S. PATENT DOCUMENTS

| | | | |
|---|---|---|---|
| 6,606,415 B1 | 8/2003 | Rao | |
| 2016/0165233 A1* | 6/2016 | Liu | H04N 21/4728 382/251 |
| 2018/0046187 A1* | 2/2018 | Martirosyan | G05D 1/106 |
| 2019/0042867 A1* | 2/2019 | Chen | G06K 9/00979 |
| 2019/0339688 A1* | 11/2019 | Cella | G05B 19/41865 |

OTHER PUBLICATIONS

Cerra, "Contrinbutions to Algorithmic Information Theory: Beoynd NCD", Paristech.
Ionescu, "Rapport interne 2005-06-28-DI-FB Étude des méthodes de classification par compression", Rapport de stage de fin d'études d'ingénieur de l'Université Politehnica de Bucarest.
Delahaye, "Définir et mesurer la complexité: La théorie algorithmique de l'information".

* cited by examiner

*Primary Examiner* — Oneal R Mistry
(74) *Attorney, Agent, or Firm* — BakerHostetler

(57) ABSTRACT

Systems and methods for the rapid analysis of images that are particularly useful in avionic contexts are provided. One specific method describes steps of computing algorithmic complexity and/or logical depth, so as to rapidly categorize objects, comprising images and/or points of interest determined in these images, according to discrete levels of structuring, organization or order. Complex image processing operations may then concern restricted subsections of the images. The complexity or logical depth computing operations may for example comprise steps of losslessly compressing the objects row by row and/or column by column, of determining statistical distributions of the compression rates of these objects, of determining one or more scores on the basis of the compression rates or of statistical moments and of locally or globally categorizing one or more received images. Developments describe system and software aspects.

14 Claims, 6 Drawing Sheets

RAPID ANALYSIS OF IMAGES

CROSS-REFERENCE TO RELATED APPLICATIONS

This application claims priority to foreign French patent application No. FR 1801094, filed on Oct. 18, 2018, the disclosure of which is incorporated by reference in its entirety.

FIELD OF THE INVENTION

The invention relates in general to the field of aeronautical mission management. The invention relates in particular to the processing of images for the rapid detection of known objects.

BACKGROUND

Certain flight phases of an aircraft may be particularly critical. For example, there are collision risks during taxiing phases. There may be faults during takeoff or particular hazards due to the geographic environment (for example mountains). Various landing or approach procedures for their part exhibit specific risks (notably of faults, in the event of significant traffic, with regard to complying with procedures that are sometimes complex). Low-altitude flight phases are also hazardous in principle.

During critical phases, the flight crew have to comply with predefined procedures and regulations (this leading to a significant workload), and at the same time take a safe route regardless of the weather conditions (which may even be poor), and hence have to anticipate potentially hazardous situations (for example collision risks) as early as possible.

In the past, many situations were solved on sight by the flight crew, calling on their experience and using rudimentary instruments (watch, compass).

Nowadays, instrumentation has evolved considerably and a number of pilot assistance systems have been developed, for example in the form of enhanced vision systems (EVS in acronym form), synthetic vision systems (SVS in acronym form) and combined vision systems (CVS in acronym form). These EVS, SVS and CVS systems are generally complex to deploy, in particular with regard to the algorithms to be implemented (for example required power of the processors, complexity of the graphic interfaces and taking account of the real time).

Nowadays, although the solutions deployed in modern aircraft are sophisticated, they are based in fine on human decision-making.

An EVS system for example reads information provided by a 2D sensor (for example an infrared camera) and then improves the overall contrast of the image (for example using conventional linear and/or non-linear filtering techniques). Certain types of relevant contour are sought (for example straight lines, circles). Where applicable, an improved presentation of the images is prepared (for example false colours for certain pixels, addition of contours, improvement of the contrast, etc.). The resultant image is presented to the pilot. Human intelligence is thus called upon in order to interpret the images. Unfortunately, it is the case that when these images are very noisy, it may be very difficult or even impossible to interpret them. The machine does not manage to satisfactorily assist the human.

A CVS system for its part uses several types of sensor so as to combine their information. This type of system generally seeks to reduce the noise and/or to maximize the payload information. The data processing operations are then generally complex and expensive in terms of time or computational power (more semantic complexity). Several types of sensor are combined so as to minimize the noise and maximize the usable information. First of all, the signals are acquired by a set of various sensors (infrared cameras, radars, etc.). In a following step, the images are then formed and analysed statistically (heightening of contrasts, etc.). These images are lastly divided into regions or areas (contours, points of interest, etc.). Predefined known objects are sought in each of these regions (for example using parametric models). The various detection operations performed in the image regions are then fused, correlated or associated with physical objects (redundancy check, detection of contradictions, determination of certainties, observation and analysis of topologies, etc.). Next, the information is interpreted and synthesized depending on the determined certainties. Lastly, the resultant information is presented to the pilot "synthetically" (depending on SVS type). This approach once again calls upon human intelligence in order to interpret the data (these however being "easier" to understand by construction). There is in particular no longer any need to show the initial images provided by the sensors.

In general terms, scientific literature dealing with the analysis of the content of the images is provided. In spite of recent progress in terms of learning, in particular deep learning, the subject remains complex and the technical problems that arise are numerous.

In avionics, there remains an industrial and operational need for advanced methods and systems for the rapid detection of known objects.

SUMMARY OF THE INVENTION

The invention relates to systems and methods for the rapid analysis of images that are particularly useful in avionic contexts. One specific method describes steps of computing algorithmic complexity and/or logical depth, so as to rapidly categorize objects, comprising images and/or points of interest determined in these images, according to discrete levels of structuring, organization or order. Complex image processing operations may then concern restricted subsections of the images. The complexity or logical depth computing operations may for example comprise steps of losslessly compressing said objects row by row and/or column by column, of determining statistical distributions of the compression rates of these objects, of determining one or more scores on the basis of the compression rates or of statistical moments and of locally or globally categorizing one or more received images. Developments describe system and software aspects.

The invention advantageously utilizes the fact that any human construction obeys design, structural, geometric and mathematical rules. Hence, by associating measurements performed on these human constructions using sensors, the figures that are gathered are not purely random (such as for example white noise), and a "certain order" is able to be detected. More generally, the invention may be used to discriminate variable sequences in nature. The living world (i.e. forms without human creation) contains complex structures but degrees of order that are also able to be detected and distinguished (for example a bird in a tree has a structure that is ordered at least differently from the leaves of the tree).

Advantageously, as the invention is implemented by way of short and rapid algorithms, the response time is minimized and the pilot's attention is able to be attracted to objects that the machine processes more rapidly. More specifically, the invention advantageously makes it possible to rapidly streamline the computing operations, i.e. to launch more complex computing operations on small and relevant subsections of the image. It is able to do this without using complex computing operations (for example large databases of objects analysed a priori in order to compare the measurements in real time using machine learning techniques).

Advantageously, the invention makes it possible to determine the presence of relevant objects probabilistically, which relevant objects may hence be tracked and/or monitored (without yet being capable of recognizing them with certainty).

Advantageously, the systems and methods according to the invention are independent of the types of sensors that are used (they may be active and/or passive). Specifically, the invention hinges on the (more or less) random features of the data provided by the sensors.

The invention advantageously makes it possible to link the world of EVS systems (which use passive and/or active information sensors, for example infrared cameras, UV, radars, lasers) to that of CVS systems (which fuse the data in a multimode context). The invention may make it possible to help the pilot understand his environment better, and hence master it better. In particular, the invention may allow the flight crew to anticipate very early, for example upstream of a CVS system in the analysis phase of each received image. In spite of the presence of a noisy image, it still makes it possible to provide payload information to the pilot in order to attract his attention.

Advantageously, this detection may specifically take place in spite of the very noisy (for example 2D) information (advantage of the machine, this information being difficult to interpret or not able to be interpreted by a human pilot). Specifically, very noisy information is able to be analysed rapidly from an algorithmic complexity perspective. From this information, the methods according to the invention make it possible to anticipate, prepare, optimize or by contrast prevent the launching of complex computing operations (for example sophisticated image processing operations), and to do so in order to improve real-time performance and/or the capability of detecting one or more relevant objects earlier.

Advantageously, the invention makes it possible to provide the pilot with alerts relating to particular geographic sectors to be monitored. In some embodiments, the invention may notably make it possible to launch more in-depth machine computing operations on certain objects associated with these geographic sectors to be monitored.

Advantageously, the method according to the invention may be used in fields other than the aeronautical field, for example in order to detect fire accompanied by smoke or fog (for example in order to explore certain areas as a priority over others while the precise meaning of the areas has not yet been determined). Similarly, the method according to the invention may be used in the field of motor vehicle driving.

Advantageously, the embodiments may improve "visibility", i.e. the vision of the pilot, for example detect a vehicle crossing the runway in fog or debris on the runway (in addition to dedicated detection systems) early. Aeronautical safety is improved.

BRIEF DESCRIPTION OF THE DRAWINGS

Various aspects and advantages of the invention will appear in support of the description of one preferred, but nonlimiting, mode of implementation of the invention, with reference to the figures below.

DETAILED DESCRIPTION

An aircraft may denote a variety of carriers, notably an aeroplane, a helicopter or a drone (remotely piloted aircraft).

More generally, the invention may apply to fields other than avionics (the term "aircraft" may be replaced by the term "vehicle", be this a land vehicle, air vehicle or marine vehicle). Specifically, the invention is advantageous in all critical contexts (security and safety of objects and people) in which physical evolution and therefore visual perception is rapid. For example, the invention is applicable to the field of automated or autonomous cars.

An "object" (hereinafter, in the aeronautical context) denotes a manipulatable or manipulated element in avionics, such as a runway, a heliport, an obstacle, a control tower, a building, a land vehicle, another aircraft, a flock of birds, etc.

An object may be (permanently or temporarily) fixed and/or mobile, deformable or non-deformable. An object may be known with its daytime and/or night-time appearance (for example runway with its daytime appearance or specifically with its signalling lights during the night).

Some calculability, decidability and algorithmic complexity techniques make it possible to detect, among the images (considered to be sets of figures), those that are "organized".

Describing what is "complex" requires a lot more words. As chance is not able to be summarized, it is incompressible and provides the most complex objects. The "random complexity" (or incompressible information content) of a digital object (text, image, video, data) is measured by the Chaitin-Kolmogorov complexity. "Structural complexity" or "organizational richness" is evaluated by Bennett logical depth (computing time). The issue of the complexity of the algorithms (P, NP, etc. classes) is another subject that generally has only an asymptotic meaning.

A (lossless) data compression program makes it possible to evaluate these complexities (the complexity is not measured). The compressed version of a file may be interpreted as a short program creating this file. Its size or length indicates an approximate value of the Chaitin-Kolmogorov complexity. The time necessary to decompress the file may be likened to the computing time to produce the starting file, and therefore to its Bennett logical depth.

These approaches (that need to be interpreted) are not used in the avionics sector, or at least not satisfactorily. These concepts may advantageously be applied in combination in the field of image processing.

Figure 1:
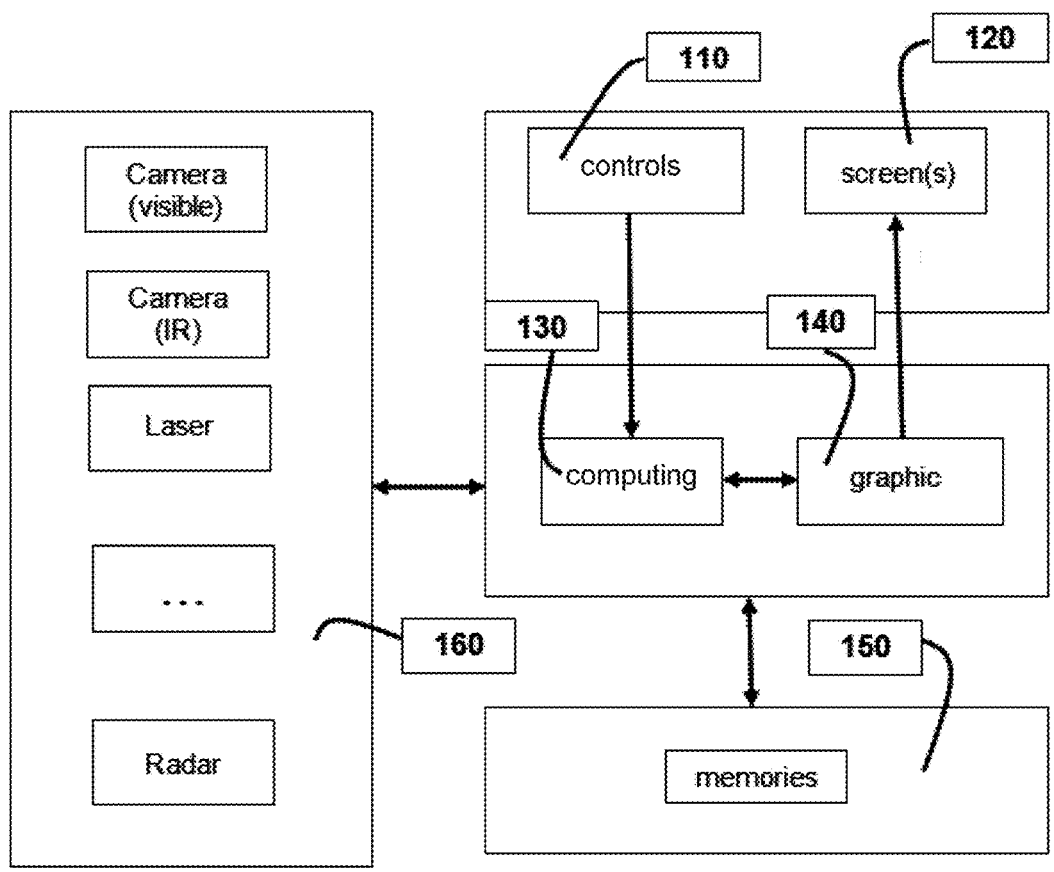
FIG. 1 is a description of the general architecture of the system according to the invention.

FIG. 1 illustrates one embodiment of the invention.

In one embodiment, the system comprises: a set of sensors (160) that provide digital information, for example in real time, to the computing module (130); these sensors may notably be image acquisition sensors (on board the aircraft, in the wings, the cockpit, underneath the aeroplane, at the rear, etc. and/or worn by the pilot, for example video headset, installed fixedly in the cockpit or moving around the aircraft by drone, etc.); the cameras may be visible light cameras, infrared IR cameras, time-of-flight TOF cameras, stereoscopic cameras, etc. computing resources (130), also called "computing module" hereinafter; graphic resources (140), also called "graphic module" hereinafter.

The computing and graphic resources generally operate in parallel or together (CPU/GPU links), and generally in "real time". The expression "real time" denotes a system capable of controlling a physical process at a speed matched to the evolution of the controlled process. According to another definition, a real-time system has to deliver exact results within short (limited) periods;

among the on-board screens, at least one screen is dedicated to the pilot and/or to the co-pilot (120); the screen may be real and/or virtual (augmented/virtual reality); a plurality of screens may be used (distribution of the information);

one or more input peripherals (110) or human-machine interfaces (HMI), such as a control panel for piloting, this containing screens, rotary controls, touch areas, buttons, etc.;

memory and/or mass storage resources (150) used by the on-board computers; volatile and/or non-volatile memories may be used; the mass storage may take place on local on-board and/or remotely accessed hard disks.

The sensors (160) may notably serve to analyse the current state of the environment outside the aircraft. Depending on the types of sensors that are used, the information that is provided may be more or less noisy. In some cases, some sensors may be momentarily inoperative for the detection of certain outside objects. The sensors (160) may deliver digital images to the computing resources (130) and to the memory and/or storage resources (150) in "real time" (i.e. within short times in comparison with the observed phenomenon).

The computing resources (130) may comprise various elements depending on the embodiments (for example ASIC circuits, FPGA, multicore or manycore processor, "GPU computing", clusters, etc.). The computing resources may be local (on-board) and/or accessed remotely (cloud computing). In one embodiment, the computing resources comprise a computer having a bus for interfacing with outside elements such as the sensors (160) and the memory resources (150). They make it possible to receive or read, rapidly or in real time, the data or images provided by the sensors (160), and also to receive one or more commands entered by the flight crew (for example via input peripherals such as a control panel (110)).

In one embodiment, the computing processor(s) used is/are capable of performing conventional computing operations on 32-bit and/or 64-bit floating-point numbers and integers. This computing module moreover has volatile random access memories, for example local RAMs that are dedicated and/or shared with the graphic resources (140). The executable code (series of instructions) may be stored on the memory module (150). The executable computing code for its part may be stored in the memory resources and/or storage resources (150).

The graphic resources (140) may notably comprise one or more graphic computers (a plurality of GPU may be arranged in combination, for example SLI, cluster) configured so as to display synthetic 2D and/or 3D images, and source video images coming from the sensors.

The synthetic images may generally be computed (rendered) in real time by way of 1D or 2D graphics primitives (for example vectors, circular arcs, alphanumerics, polygonal surfaces). The attributes of outlines may also be available (for example thicknesses of lines, dashed lines, colours, visibility). Photometric and/or geometric transformations of translation, rotation, homothety, zoom and projection type may be performed. The graphics primitives, the outline attributes and the geometric transformations may thus be parameterizable in real time (for example by way of variables). The content of these variables may notably be able to be modified by the computing resources (130).

The executable code may be stored in the memory resources and/or storage resources (150). These resources may notably comprise volatile and/or permanent storage means. These resources may be used in real time, in read mode and/or in write mode by the computing resources.

In one embodiment, some features of the sensors may be stored (notably the limits of certain parameters, for example viewing angles, limit resolutions, latency time, size of the images, limit bit rates, information type, angular settings of the boresights).

In one embodiment, the screens (120) may for example be of colour multifunction display (MFD) type, possibly equipped locally with a start/stop control and with brightness and contrast settings. As an alternative or in addition, virtual displays (VR headset) and/or augmented displays (AR headset) may be used. Various technologies may be contemplated (LED, OLED, pico projectors, etc.). In some embodiments, the resolution of the display may be limited (for example 6×6 centimetres or inches may be enough). These screens are driven by the graphic resources (140).

The input peripherals, for example the control panel (110), may be "real" (i.e. physical) and/or "virtual" (for example augmented and/or virtual reality). In one embodiment, dual-state buttons (pressed down/released) may make it possible to activate or to deactivate a set of functions of the system. The system according to the invention may specifically be "disengageable". In one embodiment, potentiometers may also make it possible to perform fine settings with regard to the brightnesses, the contrasts of the images, etc. In some embodiments, gesture-based control systems may be implemented (to manipulate the images).

The main functions performed by the pilot or the co-pilot from the control panel comprise notably initializing a flight phase (takeoff, approach, cruising, etc.), or else the possibility of customizing the ways in which the alerts are presented.

In one embodiment, the method for analysing an image comprises the steps of: receiving an image from one or more image acquisition devices on board an aircraft; determining the algorithmic complexity and/or the logical depth of the image and/or of a plurality of points of interest determined in the image; categorizing the image and/or the points of interest according to discrete levels of structuring, organization or order.

In one embodiment, the step of determining the algorithmic complexity and/or the logical depth of the image of various objects (for example the image in its entirety, and/or subsections of the image, and/or a plurality of points of interest, for example through combinatorial arrangement, determined in the image). In one embodiment, the method comprises the steps of: determining the lossless compression rates, row by row and/or column by column, of the received image and/or determining the lossless compression rates of the horizontal and/or vertical coordinates of points of interest; determining the statistical distribution of the lossless compression rates; determining one or more scores on the basis of the compression rates and/or their distribution;

categorizing the image and/or the points of interest (and/or image areas) according to discrete levels of structuring, organization or order on the basis of the application of one or more predefined thresholds to the determined scores. In one embodiment, a received image is divided into a plurality of images, and each one may be subjected to the processing according to the described method.

In one embodiment, the step of determining the algorithmic complexity and/or the logical depth of the image and/or of a plurality of points of interest determined in the image comprises the steps of: determining the lossless compression rates, row by row or column by column, of the received image; determining the statistical distribution of the lossless compression rates by computing the 1st-order to 4th-order statistical moments; determining an overall index between 0 and 1, characterizing the overall random level of said one image, on the basis of the average compression rate. An index is a score. The scores may be added (overall structuring of the entire image, local structuring of points of interest).

In one embodiment, the method comprises the steps of classifying the image into classes that are discretized according to one or more predefined alpha thresholds, for example: classifying the image as being structured if the average compression rate is greater than 4; classifying the image as being locally structured if the distribution of the compression rates is asymmetrical on the basis of the 3rd-order and 4th-order statistical moments, and classifying the image as being slightly structured or unknown in other cases. The value of 4 (alpha 1) for the compression rate is empirical. The 3rd-order and 4th-order moments examine the properties of the image in order to detect local structures.

In one embodiment, the method furthermore comprises a step of determining the existence of one or more points of interest in the images. The determination of one or more points of interest in the images may be performed in various ways. In one embodiment, the detection is performed by analysing contrast exceeding one or more predefined thresholds. For example, a threshold of 10 may be chosen on a scale from 0 to 255 for the coding of a pixel. This method is very rapid and efficient. In other embodiments, the detection may be performed by analysing contours (selected according to precise criteria), by applying a Harris detector (detection of stable corners, the points of the image where the contour abruptly changes direction), analysing the 2nd-order image (according to various derivation operators; analysing the DoG "Difference of Gaussians", the LoG "Laplacian of Gaussians" or the DoH "Difference of Hessians", ridge detection, etc.).

In one embodiment, the method furthermore comprises the steps of losslessly compressing the horizontal, respectively vertical, coordinates of the points of interest; determining the horizontal, respectively vertical, compression rates of the points of interest;
determining a position index associated with the image from the horizontal, respectively vertical, compression rates of the points of interest.

In one embodiment, the method comprises the step of classifying the points of interest discretely according to one or more predefined beta thresholds, for example as having a structured or random position, on the basis of the determined position index. A position index of 0.3 (beta 1) corresponds for example to a "random position". A position index of 0.6 (beta 2) corresponds for example to a "structured position".

In one embodiment, the method furthermore comprises the steps of: determining the statistical distribution of the geometric positions of the points of interest by computing the 1st-order to 4th-order statistical moments of said distribution; determining a point index associated with the image from the statistical moments of the distribution of the geometric positions of the points of interest.

In one embodiment, the method comprises the step of classifying the points of interest discretely according to one or more predefined gamma thresholds, for example as being structured or as being random, on the basis of the point index. A point index of 0.3 (gamma 1) corresponds for example to a "slightly structured point". A point index of 0.6 (gamma 2) corresponds for example to a "structured point".

In one embodiment, the method comprises a step of determining the geometry of one or more areas of interest, said areas of interest being for example determined on the basis of the determined indices comprising the overall index, the position index and the point index. A possibly weighted sum of the indices may be taken (for example overall score=1×overall index+2*point index+4*position index). An analytical function of the three indices is also possible (for example quadratic, exponential, etc.).

In one embodiment, the method comprises the step of computing the centre of gravity of the determined points of interest and computing the limits of a rectangle encompassing points around the centre of gravity beyond a predefined zeta threshold, said rectangle indicating an area of interest. In one embodiment, the limits of a rectangle encompass at least 90% of the points around the centre of gravity. The figure of 90% is empirically effective. In other embodiments, one or more zeta thresholds or threshold ranges may be predefined.

In one embodiment, the method comprises a step of displaying one or more of the elements comprising the image, the category of the image and/or of the points of interest, one or more points of interest, one or more areas of interest, on at least one physical and/or virtual screen. The display may notably be performed in real time or with a short delay (in comparison with the observed phenomenon).

In one embodiment, the method furthermore comprises the step of receiving or determining the current flight phase and, on the basis of said current flight phase, modifying one or more values of the alpha, beta, gamma and/or zeta thresholds. The values of the indices and/or of the thresholds and/or of their weighting in the final score may depend on the field of application (for example avionics or car driving).

In one embodiment, one or more of the steps of the method are repeated one or more times for one or more images received after a first image. A video stream may specifically be accessible. The computing operations relate each time to just one image (intra), but multiplying images makes it possible to build up information (inter), for example asymptotic convergences, increasingly authoritative confirmations of the points of interest, etc.

A description is given of a computer program product, said computer program comprising code instructions for performing one or more of the steps of the method when said program is executed on a computer.

A description is given of a system comprising non-avionic electronic flight bag EFB devices for implementing one or more steps of the method.

Figure 2:
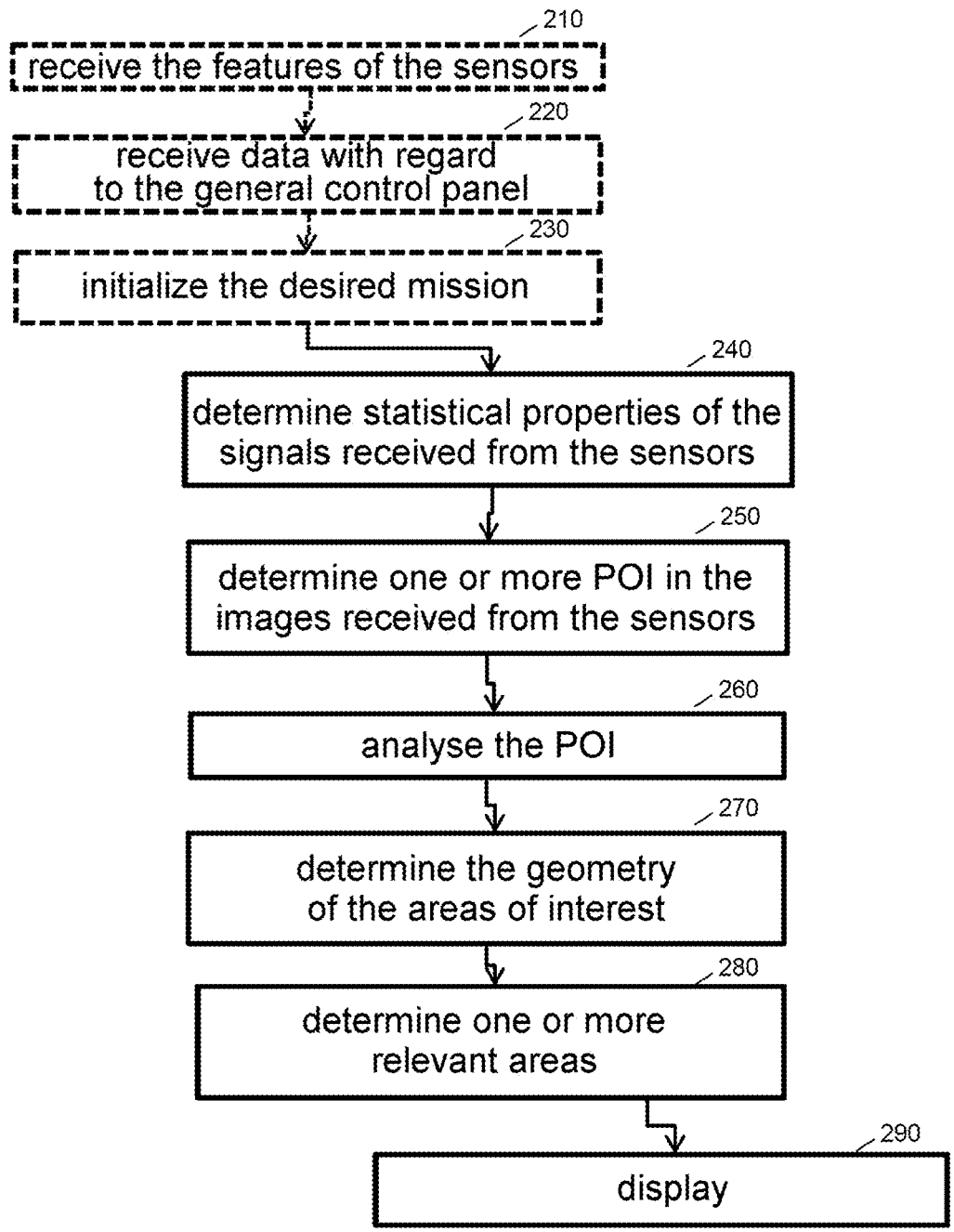
FIG. 2 shows examples of steps of the method according to the invention.

FIG. 2 shows examples of steps of the method according to the invention.

The steps are described below.

In step 210 (generally preliminary and optional in that it only optimizes the computing operations downstream), the method may sometimes comprise a step of receiving the features of the sensors (metadata):

the computing module then reads, from the memory module, the features of the various sensors and notably the limits of certain parameters;
these parameters may notably comprise the size of the images provided by the sensors (number of rows and columns), the coding type (RGB, greyscale, etc.).

In step 220 (generally preliminary and optional in that it only optimizes the computing operations downstream), the method according to the invention comprises a step of receiving data from a human-machine interface, for example from the general control panel. The computing module then reads the current state of all of the elements of the HMI (for example buttons and potentiometers) and determines the initialization options effectively chosen by the flight crew and the associated digital parameters. In one embodiment, a plurality of pushbuttons make it possible for example to select the current flight phase of the carrier (for example approach, low-altitude flying, etc.). The flight phase may also be determined automatically (using sensors, engine speed, time, altitude, incline, etc.). Depending on the current flight phase, the value of the indices used in steps 240 to 270 below is initialized. The potentiometers make it possible to regulate the brightness of the relevant areas on the screen(s) (280).

In step 230 (generally preliminary and optional in that it only optimizes the computing operations downstream), the method may comprise a step of initializing the desired mission and the default features associated therewith: the computing module may for example initialize the graphic parameters and send them to the graphic module. The graphic module then sends an initialization image to the pilot screen(s).

In step 240, the method comprises a step of performing statistical analyses on the raw information provided by the sensors. In one embodiment, for all of the information provided by the sensors, the computing module performs an analysis of histograms, of 1st-order (average), 2nd-order (standard deviation or variance) and 3rd order (coefficient of asymmetry) statistical moments and of range. A non-destructive (i.e. lossless) compression is performed on the data in order to measure a possible compression rate. This information is stored in memory for subsequent use. An overall index between 0.0 and 1.0 characterizes the overall random level of the image. The pseudocode of this step may be as follows:

```
START
   FOR each row of the image:
      -Read the number of bytes of the raw row;
      -Compress each pixel of the row with a simple and rapid algorithm
      (for example packbits algorithm);
      -Read the number of bytes of the compressed row;
      -Compute the compression rate;
      -Store the compression rate.
   END FOR
   FOR all of the found compression rates:
      -Compute the histogram;
      -Compute the range, the average, the arithmetic average
      deviation, the standard deviation;
      -Compute the 3rd-order and 4th-order moments;
   END FOR
   IF the average compression rate is high (for example > 4)
      • Classify the overall image as "structured";
   ELSE IF the distribution of the compression rates is of normal law type
   (estimated from the ratio of arithmetic average deviation to standard
   deviation close to 0.8):
      • Classify the overall image as "locally structured";
   ELSE IF the distribution of the rates is not symmetrical and more or
   less flat (estimated from the 3rd-order and 4th-order moments):
      • Classify the overall image as "slightly structured";
   ELSE
      • Classify the overall image as "unknown";
   END IF
END
```

An overall index of 0 corresponds to an "unknown" image; an index of 0.3 corresponds to a "slightly structured" image; an index of 0.6 corresponds to a "locally structured" image; an index of 1 corresponds to a "structured" image.

In step 250, the method comprises a step of determining the points of interest in the images. Various types of points of interest are possible for each image. One possible determination method is of "FAST" type, which computes a point of interest over micro-ranges of pixels. In one embodiment, a point of interest is determined if, in a micro-range, the contrasts exceed a certain threshold determined in step 240. The pseudocode of this step may be as follows:

```
START    Initialize the minimum contrast threshold between two
         pixels of the image; Below this threshold, it is considered
         that these two pixels are not discernible and therefore
         homogeneous. In our example, a threshold of 10 has been
         chosen (on a scale from 0 to 255 for the coding of a pixel).
         FOR each row of the image:
         FOR each column of the image:
             • An area of size 7x7 centred around the current
               pixel is extracted;
             • The contrast deviation from the end of 16 vectors
               is computed with the current pixel. The end of the
               vector is coded to be darker, lighter or
               homogeneous. These 16 vectors are oriented on a
               compass rose.
         FOR all of the circular arcs (formed of 11 consecutive
         vectors on the compass rose):
         IF the circular arc contains a vector darker than the central
         pixel:
         THEN store the 2D coordinates of this end vector as a
         point of interest in the image.
         END IF
         END FOR
         END FOR
         END FOR
```

In step 260, the method may comprise a step of analysing the determined points of interest. For all of the geometric positions of the points of interest, the computing module performs an analysis of histograms, of averages, of 2nd-order to 4th-order statistical moments, and of range. A type of random function is deduced therefrom. A non-destructive compression is performed on the data in order to measure a possible compression rate. An overall index between 0.0 and 1.0 characterizes the random level of the points of interest. From the current indices and the correlations with the statistics found in the previous images, a type of organization of the points of interest is deduced discretely ("highly random", "slightly structured", "organized"). This information is stored in memory for subsequent use. The pseudocode of this step may be as follows:

```
START
         - Store all of the horizontal coordinates of the points of
           interest consecutively in a buffer.
         - Compress the buffer using the same algorithm as in 240.
         - Store the horizontal compression rate.
         - Store all of the vertical coordinates of the points of interest
           consecutively in a buffer.
         - Compress the buffer using the same algorithm as in 240.
```

```
        - Store the vertical compression rate.
        IF the horizontal compression rate is high
        AND IF the vertical compression rate is high
            - classify the points of interest as "structured position".
            - archive the current class for this image, that is to say
        the position index.
        ELSE
            - classify the points of interest as "random position";
            - archive the current class for this image, that is to say
                the position index.
        END IF
        I
        FOR the horizontal coordinates of the found points:
            - Compute the histogram;
            - Compute the range, the average, the arithmetic
                average deviation, the standard deviation;
            - Compute the 3rd-order and 4th-order moments.
        END FOR
        FOR the vertical coordinates of the found points:
            - Compute the histogram;
            - Compute the range, the average, the arithmetic
                average deviation, the standard deviation;
            - Compute the 3rd-order and 4th-order moments.
        END FOR
        IF the distribution of the horizontal coordinates is of
        normal law type
        AND IF the distribution of the vertical coordinates is of
        normal law type
            - classify the points of interest as "structured points";
            - archive the current class for this image, that is to say
                the point index.
        GO to step 270
        END IF
        IF the distribution of the horizontal coordinates is of flat and
        extended type
        OR IF the distribution of the vertical coordinates is of flat
        and extended type
            - classify the points of interest as "slightly structured
                points";
            - archive the current class for this image, that is to say
                the point index.
        GO to step 270.
        END IF
END
```

A position index of 0.3 corresponds for example to a "random position". A position index of 0.6 corresponds for example to a "structured position".

A point index of 0.3 corresponds for example to a "slightly structured point". A point index of 0.6 corresponds for example to a "structured point".

In step 270, the method comprises a step of determining the geometry of the areas of interest.

When in step 260 a "slightly structured" organization type is found for at least one sensor, the computing module is able to find, from the positions of the points of interest, the rectangular limits of a relevant area in the image. The example of a "slightly structured" area is provided in FIG. 5. This relevant area makes it possible to launch more complex computing operations in order to more accurately interpret this section of the image. The pseudocode of this step may be as follows:

```
START
        - Compute the sum of the indices for the current image
        (at the time t):
        sum = overall index + position index + points index.
        - Compute the sum of the indices for the image (at the time
        t – 1):
        sum = overall index + position index + points index.
        IF the sum of the indices for the current image > 1.0
        AND IF the sum of the indices for the previous image > 1.0
            - Compute the centre of gravity of the found points of
                interest.
            - Compute the limits of the rectangle that encompasses at
                least 90% of the points around the centre of gravity.
            GO to step 280).
            ELSE
            - No area of interest to compute.
            GO to step 220).
            END IF
END
```

In step 280, the method comprises a step of displaying the relevant areas on the screen(s). For example, upon request or command from the computing module (step 270), the graphic module is able to plot (superimposition or other) one or more relevant areas. In one embodiment, this display is performed as soon as possible in order to attract the pilot's attention very early.

In one embodiment, one or more of the previous steps are performed in real time on the computer (130).

Figure 3:
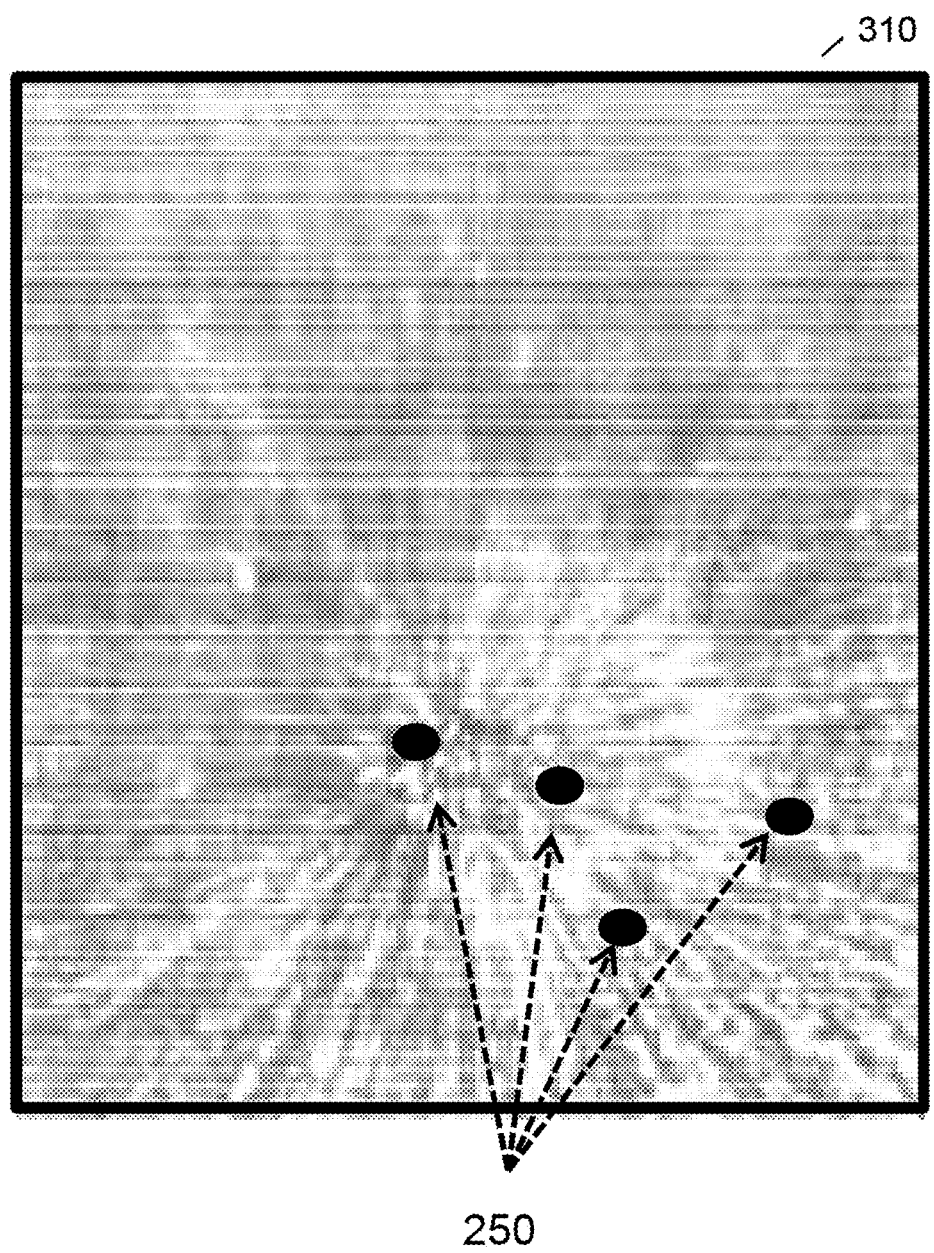
FIG. 3 shows an example of computations of points of interest on a first noisy image provided by an infrared sensor (in greyscale).

FIG. 3 shows a first image in which several points of interest have been detected. In the example that is provided, the aircraft is approaching a far-away airport. The weather situation is very poor (poor visibility, heavy snowfall).

Figure 4:
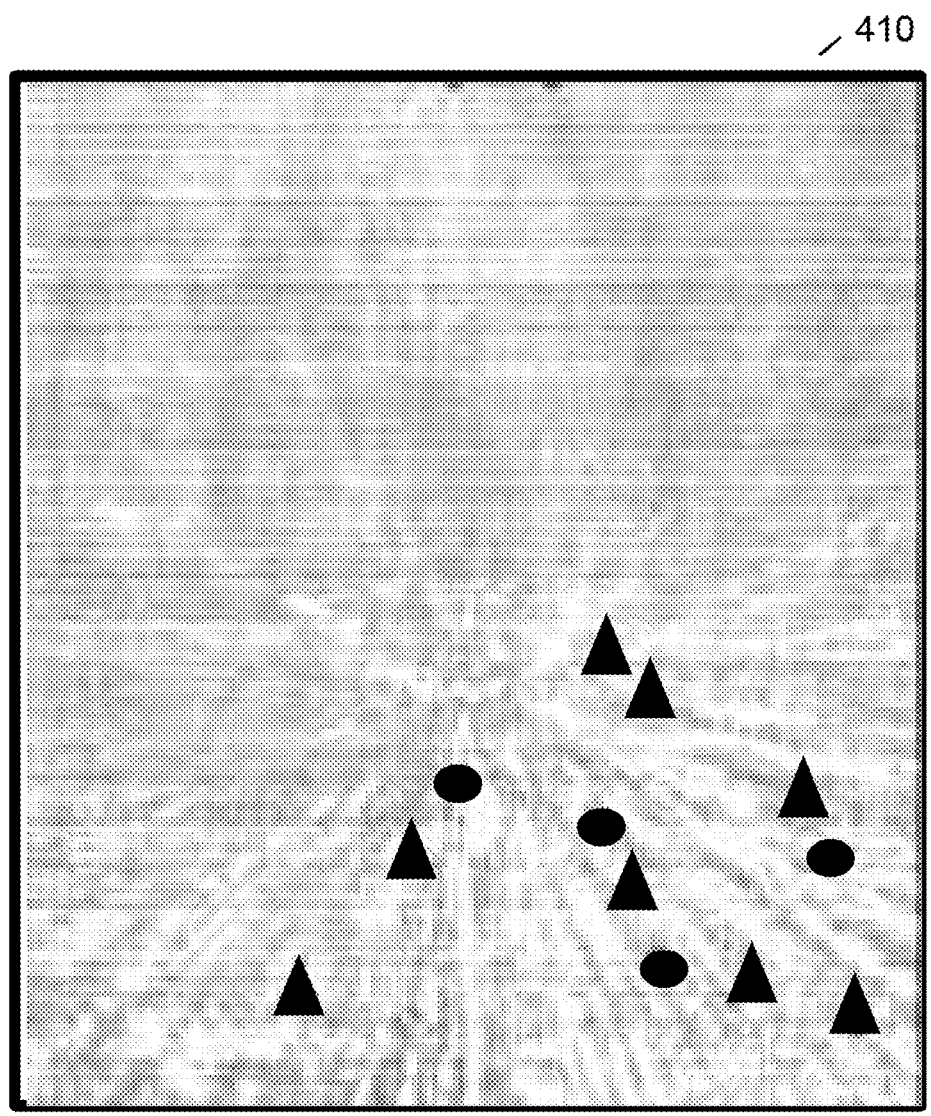
FIG. 4 shows a second image in which more points of interest are detected.

FIG. 4 shows a second image in which more points of interest have been detected. In the example, the runway begins to take shape visually.

Figure 5:
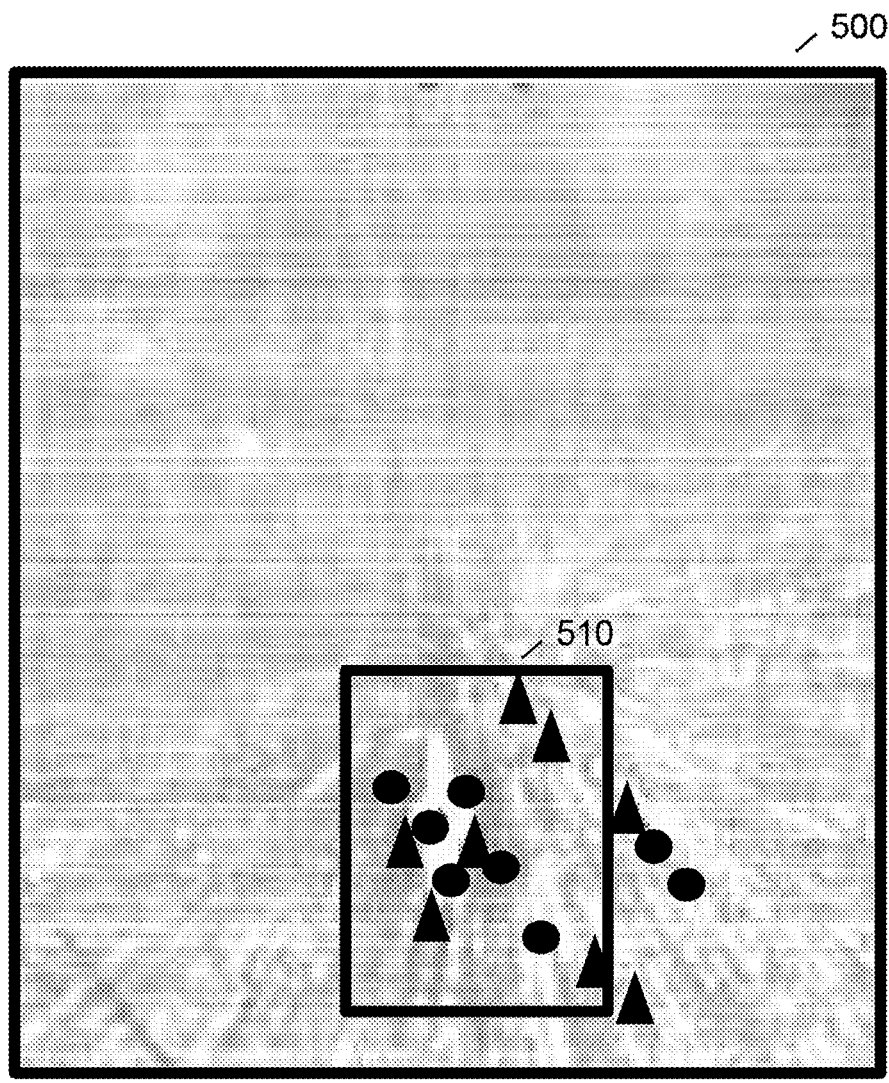
FIG. 5 shows a third image in which the detected points of interest are arranged in a structure (slightly or weakly structured).

FIG. 5 shows a third image 500 showing the beginning of the approach ramp of the runway. This is indeed a human construction with aeronautical construction rules: an "organized" area of interest 510 is determined and displayed.

Figure 6:
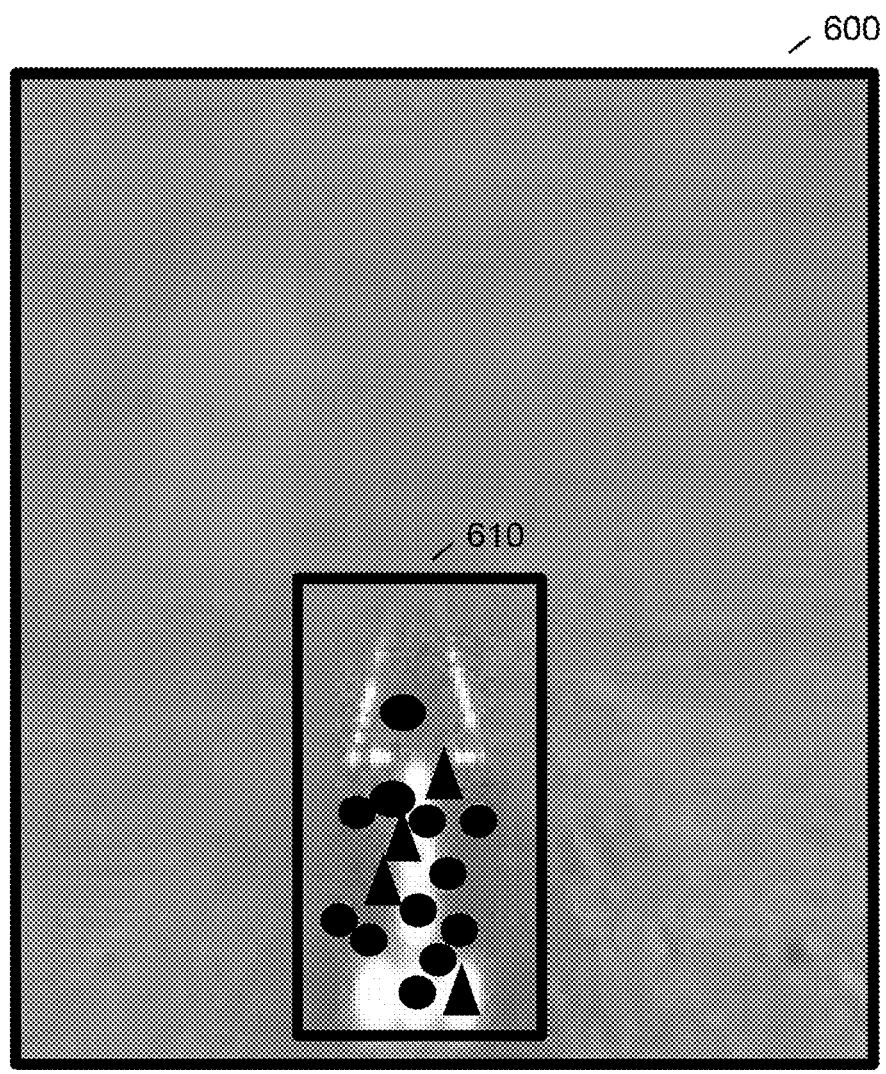
FIG. 6 shows a fourth image in which the detected points of interest are arranged in a highly structured order; i.e. an "organized" structure.

FIG. 6 shows a fourth image 600, even closer to the runway. This is also an "organized" area of interest. The runway 610 is readily visible.

In one embodiment, the invention relates to a method comprising the steps of: determining the algorithmic complexity and/or the logical depth of an image and/or of a plurality of points of interest determined in the image; and categorizing the image and/or the points of interest according to discrete levels of structuring, organization or order (for example: random, for example clouds, locally structured, for example visible runway, globally structured, for example airport taxiing); possibly displaying the category of the image.

The complexity or logical depth computing operations may for example comprise steps of losslessly compressing said objects row by row and/or column by column, of determining statistical distributions of the compression rates of these objects, of determining one or more scores on the basis of the compression rates or of statistical moments and of locally or globally categorizing one or more received images. Developments describe system and software aspects.

The invention may be implemented based on hardware elements (ASIC and/or FPGA for example) and/or software elements. It may be available as a computer program product on a computer-readable medium. In one variant embodiment, one or more steps of the method according to the invention are implemented in the form of a computer program hosted on an EFB (electronic flight bag) portable computer and/or within an FMS computer (or an FM function of a flight computer).

The invention claimed is:

1. A method for analyzing an image, comprising the steps of:
receiving an image from one or more image acquisition devices on board an aircraft;

determining an algorithmic complexity and/or a logical depth of the image and/or of a plurality of points of interest determined in the image;

categorizing the image and/or the points of interest according to discrete levels of structuring, organization, or order; and the step of determining the algorithmic complexity and/or the logical depth of the image and/or of a plurality of points of interest determined in the image comprising the steps of:

determining lossless compression rates, row by row and/or column by column, of the received image and/or determining lossless compression rates of horizontal and/or vertical coordinates of the points of interest;

determining a statistical distribution of the lossless compression rates;

determining one or more scores on the basis of the compression rates and/or their distribution; and categorizing the image and/or the points of interest according to discrete levels of structuring, organization, or order on the basis of an application of one or more predefined thresholds to the determined scores, wherein the step of determining the algorithmic complexity and/or the logical depth of the image and/or of a plurality of points of interest determined in the image comprising the steps of:

determining the lossless compression rates, row by row or column by column, of the received image;

determining the statistical distribution of the lossless compression rates by computing 1st-order to 4th-order statistical moments; and determining an overall index between 0 and 1, characterizing an overall random level of said one image, on the basis of an average compression rate.

2. The method according to claim 1, comprising the steps of categorizing or classifying the image into classes that are discretized according to one or more predefined alpha thresholds, for example:

classifying the image as being structured if the average compression rate is greater than 4;

classifying the image as being locally structured if the distribution of the compression rates is asymmetrical on the basis of the 3rd-order and 4th-order statistical moments, and classifying the image as being slightly structured or unknown in other cases.

3. The method according to claim 1, furthermore comprising a step of determining an existence of one or more points of interest in the images.

4. The method according to claim 3, furthermore comprising the steps of:

losslessly compressing the horizontal, respectively vertical, coordinates of the points of interest;

determining the horizontal, respectively vertical, compression rates of the points of interest;

determining a position index associated with the image from the horizontal, respectively vertical, compression rates of the points of interest.

5. The method according to claim 4, comprising the step of classifying the points of interest discretely according to one or more predefined beta thresholds, for example as having a structured or random position, on the basis of the determined position index.

6. The method according to claim 3, furthermore comprising the steps of:

determining the statistical distribution of geometric positions of the points of interest by computing the 1st-order to 4th-order statistical moments of said distribution; and determining a point index associated with the image from the statistical moments of the distribution of the geometric positions of the points of interest.

7. The method according to claim 6, comprising the step of classifying the points of interest discretely according to one or more predefined gamma thresholds, for example as being structured or as being random, on the basis of the point index.

8. The method according to claim 2, furthermore comprising a step of determining the geometry of one or more areas of interest, said areas of interest being determined on the basis of the determined indices comprising the overall index, the position index and the point index.

9. The method according to claim 3, comprising the step of computing a center of gravity of the determined points of interest and computing the limits of a rectangle encompassing points around the center of gravity beyond a predefined zeta threshold, said rectangle indicating an area of interest.

10. The method according to claim 1, furthermore comprising a step of displaying one or more of elements comprising the image, the category of the image and/or of the points of interest, one or more points of interest, one or more areas of interest, on at least one physical and/or virtual screen.

11. The method according to claim 2, furthermore comprising the step of receiving or determining a current flight phase and, on the basis of said current flight phase, modifying one or more values of the alpha, beta, gamma and/or zeta thresholds.

12. The method according to claim 1 further comprising repeating one or more of the steps for one or more images received after a first image.

13. A computer program product comprising program code instructions stored on a non-transitory computer readable medium, said program code instructions performing the steps of the method according to claim 1, when said computer program product is executed on a computer.

14. A system comprising non-avionic electronic flight bag EFB devices configured for implementing the steps of the method according to claim 1.

* * * * *